Sept. 22, 1931.  W. E. SHEW  1,823,918

VALVE MECHANISM

Filed Oct. 27, 1926

Inventor
Walter E. Shew
By Spencer, Hardman and Fehr
Attorney

Patented Sept. 22, 1931

1,823,918

UNITED STATES PATENT OFFICE

WALTER E. SHEW, OF DAYTON, OHIO, ASSIGNOR, BY MESNE ASSIGNMENTS, TO FRIGIDAIRE CORPORATION, A CORPORATION OF DELAWARE

VALVE MECHANISM

Application filed October 27, 1926. Serial No. 144,605.

This invention relates to improvements in valve mechanism and particularly to valve mechanism used in connection with internal-combustion and other engines, compressors and the like.

It is among the objects of the present invention to provide a means of simple structure and design for mechanically and positively operating a valve carried by a piston, which at the proper time will permit a fluid to pass freely from one side of the piston to the other.

Further objects and advantages of the present invention will be apparent from the following description, reference being had to the accompanying drawings, wherein a preferred embodiment of one form of the present invention is clearly shown.

Figure 3:
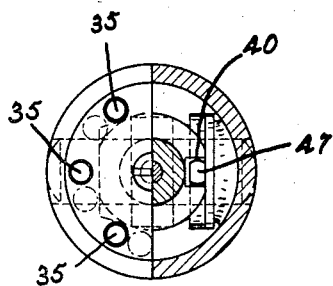
Fig. 3 is a view half in section and half in elevation taken on the line 3—3 of Fig. 1.

Referring to the drawings, the numeral 20 designates the crank case of the machine having lugs 21 and 22 provided on opposite, interior surfaces of the crank case, in which the shaft 23 is journalled. Upon this shaft 23 is mounted the eccentric element 24, secured to the shaft by means of the key 25. A pitman 26 includes the ring portion 27 fitting about the eccentric 24. At the end opposite the ring portion 27 the pitman has a head 28 pivotally mounted on the wrist pin 29, which in turn is carried in lugs formed on opposite sides of the cylinder wall of the piston 30. The piston is reciprocally contained in the cylinder 59 secured to the crank case by means of studs 60.

Piston 30 has a head portion 31, the upper or outer surface of which is counterbored to receive a flanged portion of the valve mechanism.

Figure 2:
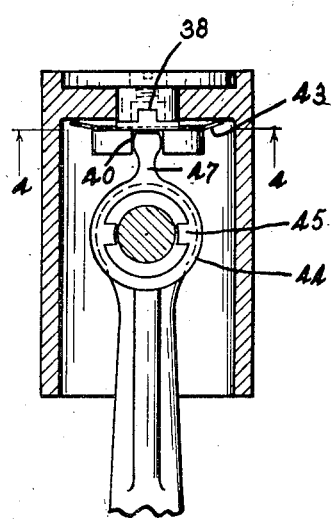
Fig. 2 is a detailed sectional view taken along the line 2—2 of Fig. 1.
Figure 4:
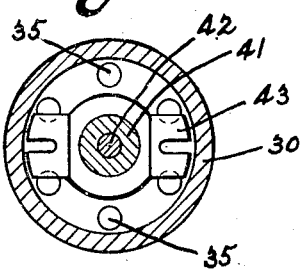
Fig. 4 is a detailed sectional view taken along the line 4—4 of Fig. 2.

The valve comprises two members 32 and 33. The member 32 includes a flange portion 34 adapted to fit in the counterbored portion of the piston head. This flange in the present instance, is shown provided with a plurality of openings 35, arranged in circular formation about the axis of the valve member. These openings or apertures 35 are adapted to be moved into alignment with apertures 36 provided in the piston head, thereby providing communication with the spaces in the cylinder on each side of the piston head. The valve member 32 also includes a lug portion 37 formed on the flange portion and extending into an aperture provided in the piston head concentric to the axis of the piston. The outer surface of this lug portion is provided with a transverse slot 38, shown in Fig. 2.

The second member of the valve is designated by the numeral 33 and includes a flange portion 39 provided with a slot 40. The flange portion 39 has a lug portion 41 which extends into the central aperture of the piston head and engages the outer surface of the lug portion 37 of the valve member 34. This portion 41 has a tongue which extends into the transverse slot 38, thereby locking the two valve members 32 and 33 as regards rotative movement. A screw stud 42 passing through a central aperture in the two members securely holds these two valve members 32 and 33 together.

Figure 1:
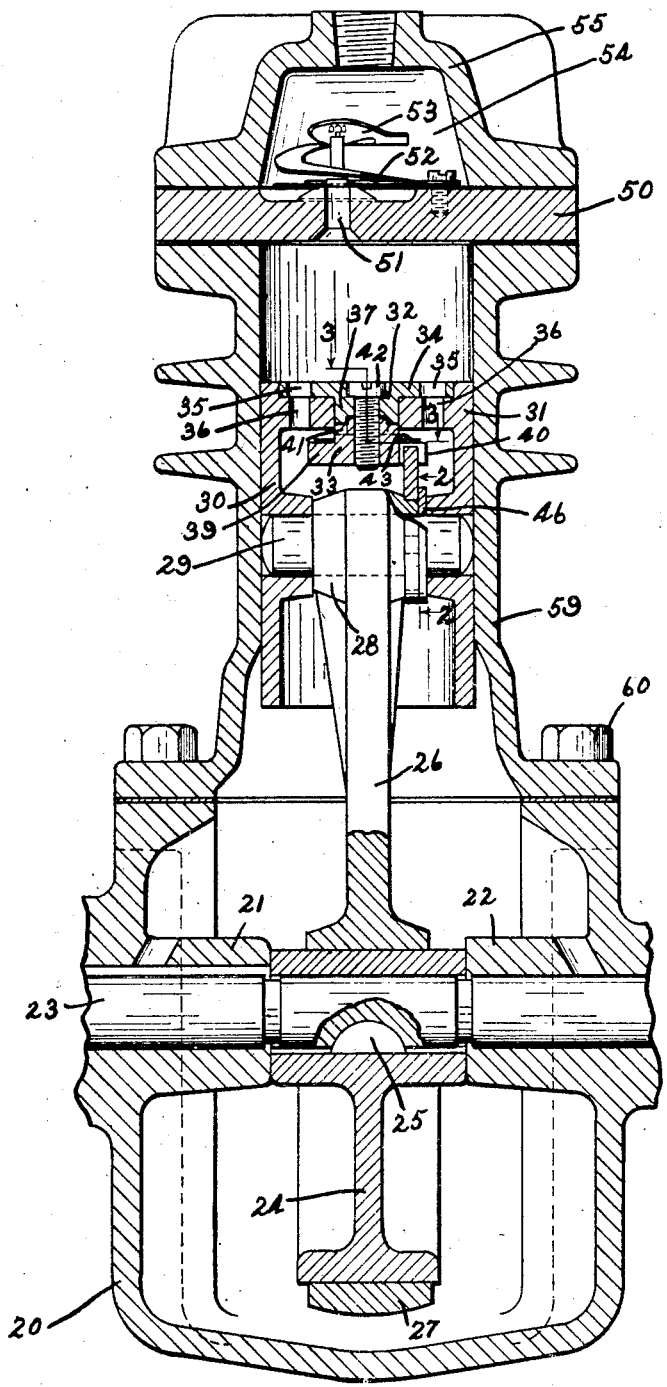
Fig. 1 is a vertical section of the machine including the valve mechanism.

As shown in Fig. 1 the flanged portion 39 of the valve member 33 is spaced from the interior surface of the piston head. Interposed between this flange 39 and the interior of the piston head, is a spring washer 43, which exerts pressure against the flange 39 and tends to hold the flanged portion 34 of the valve member 32 tightly against the upper surface of the piston head.

On one side of the head 28 of the pitman 26 there is mounted a ring 44 secured to said pitman head by a tongue and groove 45 formed on the ring and head respectively. A washer 46 is placed against the side of the pitman head, said washer tending to hold the ring 44 in position when the pitman is placed in the piston. The ring 44 is provided with a tongue 47 which extends into the slot 40 formed in the edge of the flange 39 of valve member 33.

When the machine is operating the pitman head 28 will be oscillated on the wrist pin 29, thus causing the tongue 47 of the ring 44 to be oscillated also. Due to the connection between the tongue 47 and the flange 39 of the valve member 33 it may clearly be seen that the oscillatory movement of the tongue 47 will cause the valve to be rotated, thus moving the openings 35 into and out of alignment with the apertures 36 formed in the piston head and thus opening and closing communication between the opposite sides of the piston head, respectively. As the piston is moved upwardly or as the eccentric moves from its lower dead center toward the side of its stroke, and upwardly, the pitman head 28 will be oscillated to cause the tongue 47 to operate the valve mechanism so that the opening 35 will be moved out of alignment with the apertures 36 in the piston head. Thus all fluid in the space above the piston will be compressed. Fig. 1 shows the cylinder provided with a cover 50 having a central passage 51 controlled by a plate valve 52, said valve being held against its seat by means of the spring 53. The spring 53 will hold the valve against its seat until a predetermined pressure is obtained within the cylinder, at which time the valve 52 will be permitted to open and the fluids from the cylinder will be discharged through passage 52 into the space 54 within the housing 55.

On the down-stroke of the pitman 26 from its upper dead center and as the eccentric moves downwardly toward the side, the valve mechanism will again be operated to move the openings 35 into alignment with the apertures 36, thus permitting fluid in the crank case to pass freely through these aligned openings into the space above the piston.

While the form of embodiment of the present invention as herein disclosed, constitutes a preferred form, it is understood that other forms might be adopted, all coming within the scope of the claims which follow.

What is claimed is as follows:

1. In a device of the character described, the combination with a piston having a head portion, including an aperture concentric with the axis of the piston, and an aperture offset from the first mentioned aperture; a rotatable valve in said head, said valve including two members, one of which has an apertured plate portion resting on the piston head and a central stud portion extending into the central aperture of said piston head, the stud portion having a transverse slot in its outer surface; the other member comprising a flanged portion having a slot and spaced from the interior surface of the piston head, said flanged portion having a central stud extending into the central aperture in the piston head, said stud being provided with a transverse projecting tongue adapted to extend into the transverse slot of the other valve member; a screw stud holding the two members engaged; a spring washer interposed between the interior of the piston head and the second valve member so as to hold the plate portion of the valve against the outer surface of the piston head; a pitman pivotally secured to the piston; and a tongued ring secured to the pitman, the tongue of said ring engaging the slot in the flanged portion of the valve member in the piston so as to operate said valve.

2. In a device of the character described, the combination with a piston having side walls and a head portion, said head having a port extending therethrough, a rotatable valve cooperating with the port for opening and closing same, means for yieldingly holding said valve in position, a pitman pivotally secured to the side walls of the piston, and means associated with said pitman for operating said valve, said means comprising a tongued ring adapted to operate said valve said ring being keyed to said pitman by a tongue and groove engagement therewith, and a spacing washer between said ring and the adjacent side wall of said piston to retain said ring locked to said pitman.

3. In a device of the character described, the combination with a piston having side walls, and a head portion, said head having a port extending therethrough, a rotatable valve cooperating with the port for opening and closing same, means for yieldingly holding said valve in position, a pitman pivotally secured to the side walls of said piston, and means associated with said pitman for operating said valve, said means comprising a ring member carried by said pitman and slot interconnection between said valve and said ring.

4. In a device of the character described, the combination with a piston having side walls and a head portion, said head having a port extending therethrough, a rotatable valve cooperating with the port for opening and closing same, means for yieldingly holding said valve in position, a pitman pivotally secured to the side walls of said piston, and means associated with said pitman for operating said valve, said means comprising a slot in said valve, a ring keyed to said pitman and having a tongue member adapted to engage said slot to operate said valve, and a spacing washer disposed intermediate said ring and the side wall of said piston to hold said ring locked in operative relation to said pitman.

In testimony whereof I hereto affix my signature.

WALTER E. SHEW.